3,377,170
PHOTOCHROMIC CELLULOSE COMPOSITIONS
Sydney Arthur Giddings, New Canaan, and Lawrence Joseph Patella, Huntington, Conn., assignors to American Cyanamid Company, Stamford, Conn., a corporation of Maine
No Drawing. Filed Oct. 27, 1964, Ser. No. 406,879
8 Claims. (Cl. 96—90)

ABSTRACT OF THE DISCLOSURE

A photochromic composition composed of cellulose which has been contacted with certain metal compounds and a method for the production of said compositions which comprises contacting the cellulose with a solution of the metal compound and drying the resultant cellulose are disclosed.

---

This invention relates to photochromic materials. More particularly, this invention relates to materials such as cellulosic paper and regenerated cellulose film contacted with a transition metal compound, which combination exhibits photochromic properties.

The production of photochromic paper per se is not new in the art. Berman, in U.S. Patent No. 2,953,454, discloses a method for the production of photochromic paper wherein the paper is coated with minute, liquid-containing capsules having light-translucent walls, said liquid having dissolved therein a photochromic material. The method disclosed by Berman, however, is relatively expensive and very difficult to conduct, especially in regard to obtaining a uniform, continuous covering of the paper with the microscopic, solution-containing capsules. Additionally, since these capsules are pressure sensitive and the photochromic material is only active in solution, the treated paper must be carefully stored and handled lest its usefulness will be destroyed by rupture of the capsules upon the slightest contact.

Sheppard et al., in U.S. Patent 1,934,451, disclose photo-sensitive layers and papers coated with these layers, said layers comprising compounds such as sodium tungstate in admixture with dextrose. However, there are critical differences between said coated papers and the materials instantly disclosed. Thus the specific Sheppard et al. photo-sensitive compounds are excluded from the instant disclosure since the papers coated with said compounds do not exhibit substantial reversibility, i.e., do not revert substantially to their original color when the activating radiation is removed. Hence such systems are not useful in temporary photocopying applications which is an important use of the instant materials.

Further details of these and other important differences are set forth hereinbelow.

We have found that the relatively commercially unattractive characteristics of the prior art photochromic articles may be overcome by contacting cellulosic paper or regenerated cellulose with a transition metal compound having the formula $$MX_mO_n(OR)_p \quad (I)$$

wherein M is a transition metal; X is halogen; R is an alkyl radical having from 1–12 carbon atoms, inclusive, an aryl radical having from 6–10 carbon atoms, inclusive, or a

radical wherein $R^1$ is an alkyl radical having from 1–2 carbon atoms, inclusive, or an aryl radical having from 6–10 carbon atoms, inclusive; $m$ and $p$ are whole, positive integers of from 0–6, inclusive, and $n$ is a whole, positive integer of from 0–2, inclusive; the total of $2n+m+p$ being equal to the valence of the metal M, at least one of $m$ and $p$ being an integer of at least 1.

We have discovered that said photochromic materials change color when subjected to ultraviolet light and revert to their original color when removed from said light or when subjected to near infrared light or a thermal treatment and further exhibit the property of heat absorption in the near infrared.

The use of photochromic materials as active ingredients in such applications as data storage devices, absorbers for incident, high-intensity radiation, photochemical printing, variable transmission devices and the like is well known in the art. There has been, however, to our knowledge, no disclosure of the production of photochromic cellulosic paper or photochromic regenerated cellulose films which can be colored by exposure to ultraviolet light and bleached when removed from said light or when exposed to near infrared light. Furthermore, the prior art is silent in regard to cellulosic paper and regenerated cellulose films which have the property of photochromism with changes in transmission in the visible regions coupled with heat absorption in the near infrared.

It is an object of the instant invention to provide photochromic materials such as photochromic cellulosic paper and photochromic regenerated cellulose film.

It is a further object of the instant invention to provide base materials such as cellulosic paper and regenerated cellulose films coated with a transition metal compound or having the same uniformly dispersed throughout their masses, said materials being heat absorbent in the near infrared as well as photochromic.

These and further objects of the instant invention will become more apparent to one skilled in the art upon reading the more detailed description set forth hereinbelow.

Photochromism

The term "photochromism" is used herein to describe the phenomenon whereby molecules or complexes undergo reversible photoinduced color changes. That is to say, in the absence of activating radiation, the system has a single stable electronic configuration with a characteristic absorption spectrum. When the system is contacted with ultraviolet irradiation the absorption spectrum for the system changes drastically, but when the irradiation source is removed, the system reverts to its original state.

Photochromism has been observed in inorganic and organic compounds both in solution and solid state. Although the exact mechanism of color change varies markedly in each individual system, there are two processes which account for most types of photochromic phenomena.

The first process is the transformation of excited state electronic energy into vibrational and torsional twisting modes of the molecule. Usually, systems observed to be photochromic have very efficient routes for internal transformation of absorbed energy and are generally never fluorescent or phosphorescent. Internal transformation often takes place very rapidly, that is to say, the primary process in the photoproduction of a colored species often occurs in about a millimicrosecond. However, optical observation of the colored species normally takes considerably longer than this because of the very small amounts of colored material produced per unit time and the depletion of the color by the completing reverse reaction.

The second fundamental photo-electronic mechanism generally considered as producing photochromism is charge transfer. Most charge transfer phenomena in organic molecules are rapidly reversible and therefore produce no colored intermediate. However, in inorganic crystals, charge transfer absorption usually leads to a colored state in which the donor-acceptor crystals have been oxidized and reduced.

There are three major factors which govern the behavior of a photochromic system.

A. Absorption of incident radiation

According to the quantum theory, each absorbed quantum creates one activated molecule and only absorbed radiation can produce a chemical change. Variables which control the number of photons absorbed include the concentration and extinction coefficient of the photochrome, the cell length, the screening coefficients of other components of the system, and the wavelengths of the incident radiation.

B. Quantum yield

All excited molecules will not undergo transformation to the colored form; hence the quantum yields will generally be less than unity. Various deactivating processes which compete for the excited molecules include fluorescence, phosphorescence, permanent chemical change and thermal release.

C. The reverse reaction

In both the forward and reverse reactions, the concentration of the colored form is dependent on the intensity of the radiation, the kinetics of the reverse reactions, and temperature and solvent sensitivity of the reactions. The kinetics for the reverse reaction will normally be controlling; however some reverse reactions are thermally sensitive and are accelerated by irradiation.

The terms "photochromic substance" or "photochromic material," and the like, as used in the instant disclosure, mean substances or materials which change their transmission or reflectance upon being subjected to ultraviolet or visible irradiation and subsequently revert to their original state upon subjection thereof to a different wavelength of radiation or removal of the initial ultraviolet source.

Depending on the transition metal compound employed and many other factors including those mentioned above, the photochromic materials of this invention may vary widely in their reaction to different sources of irradiation. Thus, some of the photochromic materials will change color when exposed to ordinary sunlight and revert back to their original color upon removal thereof from the rays of the sun. Various other materials, however, change color only when subjected to a cetrain degree of irradiation, as in ultraviolet light, and sunlight will not affect them. Thus, the intensity of the radiation required is sometimes high, such as 10-25 cal./cm.$^2$/sec. or more, whereas, in other cases, low intensity radiation as in sunlight (0.2 cal./cm.$^2$/sec.), often suffices. Nevertheless, while the photochromic behavior may differ widely in the aforesaid manner, all of said compositions are encompassed by the present invention.

The compositions of matter

As mentioned above, we have found that novel photochromic compositions of matter can be produced by contacting a base material with a transition metal compound represented by Formula I above. By "contacting" is meant coating fully manufactured paper or film with a solution of the transition metal compound or distributing the transition metal compound throughout the paper or film by blending said compound with paper- or film-forming ingredients containing a solvent for said compound at any convenient stage in the manufacture of said base materials as described hereinbelow. Of the foregoing methods, coating the finished base material with a solution of the transition metal compound is preferred.

Examples of transition metal compounds which may be utilized in producing the compositions of matter of the present invention and which are represented by Formula I, include:

titanium tetrachloride
titanium oxide dichloride
titanium tetrabromide
titanium oxide dibromide
titanium tetraiodide
titanium oxide diiodide
titanium tetrafluoride
titanium oxide difluoride
titanium tetramethoxide
titanium tetraethoxide
titanium tetraheptoxide
titanium tetradodecoxide
titanium oxide dimethoxide
titanium dichloride dimethoxide
titanium trichloride ethoxide
titanium chloride trimethoxide
zirconium tetrachloride
zirconium oxide dichloride
zirconium tetrabromide
zirconium oxide dibromide
zirconium tetraiodide
zirconium oxide diiodide
zirconium tetrafluoride
zirconium oxide difluoride
zirconium tetramethoxide
zirconium tetraphenoxide
zirconium tetra(p-tolyloxide)
zirconium tetra(1-naphthoxide)
zirconium oxide dimethoxide
zirconium oxide diphenoxide
zirconium dibromide diethoxide
zirconium trifluoride butoxide
zirconium iodide trimethoxide
tungsten hexachloride
tungsten oxide tetrachloride
tungsten dioxide dichloride
tungsten hexabromide
tungsten oxide tetrabromide
tungsten dioxide dibromide
tungsten hexaiodide
tungsten oxide tetraiodide
tungsten dioxide diiodide
tungsten hexafluoride
tungsten oxide tetrafluoride
tungsten dioxide difluoride
tungsten hexamethoxide
tungsten oxide tetrabenzoate
tungsten dioxide diacetate
tungsten pentachloride methoxide
tungsten tetrabromide bis(p-toluate)
tungsten triiodide tris(p-tolyloxide)
tungsten dichloride tetravalerate
tungsten bromide penta(1-naphthoate)
hafnium tetrachloride
hafnium oxide dichloride
hafnium tetrabromide
hafnium oxide dibromide
hafnium tetraiodide
hafnium oxide diiodide
hafnium tetrafluoride
hafnium oxide difluoride
hafnium tetraacetate
hafnium tetravalerate
hafnium tetralaurate
hafnium oxide diacetate
hafnium dibromide divalerate
hafnium trifluoride laurate
hafnium chloride triphenoxide
tantalum pentachloride
tantalum oxide trichloride
tantalum dioxide chloride
tantalum pentabromide
tantalum oxide tribromide
tantalum dioxide bromide
tantalum pentaiodide
tantalum oxide triiodide
tantalum dioxide iodide tantalum pentafluoride
tantalum oxide trifluoride
tantalum dioxide fluoride
tantalum pentamethoxide
tantalum pentabenzoate
tantalum penta(p-toluate)
tantalum penta(2-naphthoate)
tantalum oxide tribenzoate
tantalum dioxide methoxide
tantalum dichloride triethoxide
tantalum tetrabromide acetate
tantalum bromide tetraphenoxide
tantalum trifluoride dimethoxide
chromium dioxide dichloride
chromium dioxide dimethoxide
vanadium oxide trichloride
vanadium oxide triiodide
vanadium dioxide bromide
vanadium dioxide methoxide
niobium pentachloride and the like.

The transition metal compounds listed above are all well known in the art and may be produced by any equally well known procedure. Examples of applicable methods for the production thereof appear in at least one of the following articles. Razivaer et al., Tetrahedron, 6, 159 (1959); Sandho et al., Current Sci. (Ind.), 29, 222 (1960); Rosenheim, Ch. Nernst. Z. Anorg. Chem., 214, 220 (1933); Bradley et al., J. Chem. Soc. (1953), 1634. These references are incorporated herein by reference.

As stated above, the finished base material may be contacted with a solution of the transition metal compound to form a coating or the compound may be intimately dispersed throughout the base material by adding the compound to a mixture of base material-forming ingredients also containing a solvent for the compound.

Coating may be effected by dissolving the transition metal compound in a suitable solvent and applying said solution by any convenient method, e.g., dip-, brush-, flow-, roller- or spray-coating, and allowing the thus-coated base material to dry. About 0.1% to 10% by weight of transition metal compound in solvent will be effective but concentrations may be varied substantially up to the maximum solubility of the transition metal compound in the solvent. The total amount of solution employed will depend on the amount of transition metal compound it is desired to deposit on or within the base material. Generally, from about 0.1% to 15% by weight of said compound, based on the dry weight of base material, will be effective, but larger amounts may also be employed.

Suitable solvents include the following nonlimiting materials: dimethyl formamide, acetonitrile, methylene chloride, glyme ($CH_3OCH_2CH_2OCH_3$), diglyme

chloroform, ethyl acetate, methylene chloride, trioxane, dioxane, ethyl formate, ethylene dichloride, isopropyl acetate, methyl acetate, acetic acid, acetone, benzil, acetaldehyde, benzaldehyde, butyl acetate, cyclohexanol acetate, cyclohexanone, methylethylketone, toluol, gammavalerolactone, methanol, ethanol, hexanol, nitrobenzene, nitropropane, trichloroethylene, aniline, diacetone alcohol, ethyl lactate, carbon tetrachloride pyridine, toluol, xylol, ethylene glycol, and the like.

Water alone as well as strongly basic nitrogen-containing sovents alone should not be employed as solvents for distributing the transition metal compound by coating or by addition during manufacture of the base material since the transition metal compounds hydrolyze in the presence of these solvents. However, water in admixture with water-miscible solvents may be employed since the transition metal compounds can tolerate some degree of hydrolysis without losing their photochromic effect. When so used in admixture with other solvents, the water should not constitute more than about 50% by weight of the solvent mixture.

Useful water-miscible solvents include, e.g., water-soluble alcohols such as methanol, ethanol and isopropanol; glycols such as ethylene and diethylene glycol; ethers such as diethylene glycol diethyl ether, dimethoxy-tetraglycol; oxides such as ethylene oxide and dioxane; and alcohol-ethers such as ethylene glycol monomethyl ether and diethylene glycol monomethyl ether.

Acidified aqueous solutions in place of the above solvent mixtures are also operable since the power to hydrolyze is reduced to a negligible level by acidification. However, a non-aqueous oxygen-containing solvent such as dioxane will preferably be employed.

Each type of base material is more fully described hereinbelow as well as the steps whereby the transition metal compound may be distributed throughout said materials during manufacture thereof. It should be understood that water, if at all present in the manufacturing process, is in admixture with a water-miscible solvent or the water is acidified with any suitable acid material to reduce the danger of hydrolysis of the transition metal compounds. Preferably, water will be excluded as a solvent.

The term "cellulosic base material" is used herein to mean cellulosic paper and regenerated cellulose sheets or film as well as the equivalents of these materials.

The cellulosic paper base

According to the present invention, any cellulosic paper material may be used to form the photochromic products of the present invention. The cellulosic paper may be made from all types of fiber stocks, including those of poor quality, such as oak, poplar, and yellow birch, and those of extremely short fiber length, as well as those of long fiber length and of good quality derivation, such as from spruce and hemlock. A wide variety of fibrous cellulosic material used in the preparation of paper, board, molded resin fillers, and the like may be used, such as kraft pulp, rag pulp, soda, sulfate, ground-wood, sulfite pulp and alpha pulp. Similarly, other forms of paper-forming fibrous cellulose such as cotton linters, and the like may be employed. These materials may be used alone or in admixture with fibers from other sources, such as jute, hemp, sisal, strings, chopped canvas, and other material, either cellulosic or non-cellulosic.

It is further stressed that the cellulosic base paper may also be obtained from bleached or unbleached kraft, bleached or unbleached sulfits, or bleached or unbleached semi-chemical pulps. In addition, the paper may be made from mixtures of cellulosic paper-forming pulps with up to 10% and preferably containing 1 to 5% of other fibers, such as glass fibers or a minor amount of any of the synthetic fibers mentioned hereinbelow.

For most purposes it is preferred that the starting cellulosic paper be unsized and generally free of added resins. However, for some purposes, it may be desirable to employ as the starting paper base sheet a porous high wet strength paper such as may be obtained by incorporation into the paper base sheet 0.5 to 5% by weight, based on the weight of the fibers, of a thermosetting aminoplast resin, such as a urea-formaldehyde resin, a melamine-formaldehyde resin or methylolated ureido polymers, such as those obtained by the reaction of formaldehyde with polymers and copolymers of N-vinyl-oxyethyl-N,N'-ethyleneurea. Such wet strength cellulosic papers are obtained in the conventional way by the use of one of the resins just cited applied to the pulp suspensions followed by sheeting and baking at temperatures of 210° to 400° F. for periods of about one-half or an hour at lower temperatures to five or ten minutes at the higher temperatures.

The method of making the cellulosic paper base is not critical and any paper-making process may be employed to form the cellulosic paper bases used in the present invention. For example, in the normal manufacture of paper, cellulosic fibers such as those derived from wood pulp are beaten in water to disperse the fibers therein and to reduce them to a length and fineness suitable for use in paper-making. During the beating operation the cellulosic fibers fibrillate, the fibrillation manifesting itself by a fraying or shredding of the surfaces and ends of the fibers to produce minute tendrils or fibrils which serve to interlock the fibers together when they are deposited on the forming screen of a paper-making machine to make a sheet therefrom and dried. The interlocking of these fibrils projecting from the deposited fibers imparts coherency and strength to the paper. In other words, the strength in the paper is attained through the interlocking of large numbers of fiber branches or fibrils during sheet formation.

The transition metal compound may be added to the cellulosic paper anytime during the production thereof or even shortly after the paper has been sheeted. Thus, a beater pulp of papermaking cellulose fibers of any convenient consistence, for example, between about 0.5% to 5%, may be prepared. To this can be added any of the transition metal compounds described hereinabove. As already mentioned, some other solvent should be present to dilute the water in the beater pulp in order to minimize hydrolysis of the transition metal compound. Alternatively, the beater pulp may be acidified. The suspension is agitated gently to dissolve and distribute the transition metal compound uniformly therethrough and the aqueous suspension of fibers is then sheeted, preferably at a pH between 4.5 and 6, to form a wet waterlaid web containing the transition metal compound. The web is then dried on steam-heated rolls, in accordance with conventional practice.

More specifically, in mills where various pigments are added at the beater, the transition metal compound may be added therewith or at any time thereafter but sufficiently far from the wire to permit dissolution and distribution of the added compound throughout the fibers before the sheeting step begins.

In mills where the paper pulp suspension is given heavy refining, the transition metal compound may be added to the beater, to the refiner effluent or to the screen effluent sufficiently ahead of the wire so that dissolution and distribution becomes substantially complete before the sheeting step.

Thus, the application of the transition metal compound may be easily adapted to most types of paper or mill conditions. Therefore, the transition metal compound may be added to the paper pulp prior to sheet formation or may be applied to the sheet at a convenient point after sheet formation, even at the size press or calendar stacks, for example. At these points late in the paper-making process, when much of the solvent has been removed, the transition metal compound will be dissolved in a non-aqueous solvent alone or in admixture with water and applied as a solution to the paper as it being sheeted, for example.

The paper obtained consists essentially of cellulose fiber having the transition metal compound uniformly distributed throughout its mass. The paper changes color upon contact with ultraviolet light and reverts to its original color upon removal of the light.

The regenerated cellulose base

Although the following discussion will be directed principally to cellophane as a base, this invention contemplates, as the base into which the transition metal compound is incorporated, any smooth, substantially non-porous, non-fibrous sheet, especially cellulosic film, precipitated from an aqueous cellulosic dispersion or solution or from solution in an organic solvent (one or more organic liquids). This includes sheets of regenerated cellulose whether precipitated from viscous (solutions of cellulose xanthate), cuprammonium or other aqueous solutions or dispersions of cellulose. It also includes sheets of cellulose ethers and esters precipitated from aqueous solutions or dispersions such as glycol cellulose, cellulose glycolic acid, alkyl cellulose (preferably methyl or ethyl cellulose), cellulose phthalic acid, and other similar cellulosic products.

Regenerated cellulose, in the form of cellophane, generally exists as a hydrophyllic film produced from purified wood pulp derived from spruce, pine, fur or hemlock trees. It consists of a plasticized base film of regenerated cellulose, which is generally later coated with a nitrocellulose lacquer. The base film is essentially grease proof and can be made water vapor proof and even waterproof by adding various coating formulations thereto. The ultimate characteristics desired in the cellophane generally govern the selection of film coated thereon. However, most of the coatings are of the lacquer type consisting of, for example, nitrocellulose, resins, plasticizers and waxes.

The cellophane or other material represented by the generic disclosure above, employed in the present invention may be produced by any known method, the specific method of preparation thereof, as in the case of the paper bases, not constituting part of the present invention.

Generally, cellophane is produced by mixing wood chips, wood pulp or other cellulosic material with an aqueous caustic solution of 18% to 20% concentration. The cellulose is steeped in this solution for from about 20 to 60 minutes, depending upon the quality of the pulp used, and the resultant alkali cellulose is pressed to remove excess liquor. The pressing reduces the weight of the cellulose down to approximately three times that of the pulp employed. The alkali cellulose is then shredded and aged one or more days depending upon the final viscosity desired. The alkali cellulose is next xanthated by treatment with carbon disulfide in large horizontal barattes. The color of the mass changes from white through yellow to orange and the resultant sodium celluolse xanthate is dissolved in a caustic solution thereby forming viscose. This xanthate material is filtered, deaerated and ripened for a period of at least one day. At this point various additives may be mixed with the viscose in order to prevent incrustation thereof on the extruders and to impart other desired properties thereto.

The viscose is next extruded in the form of sheets and the like, directly from the ripening tank into a coagulating bath containing sulfuric acid and sodium sulfate in order to coagulate the viscose into a film and to regenerate the cellulose xanthate to cellulose. The film next proceeds through two tanks containing sulfuric acid and sodium sulfate of lower concentrations than the coagulating bath and then through tanks containing hot water, wherein hydrogen sulfite and carbon disulfite are driven off and salt and acid is washed from the cellulose film. The film is next removed to a dilute caustic bath wherein it is desulfurized and is then passed through two tanks containing warm water. A series of five tanks are then used to bleach and wash the film by removing the last traces of any remaining sulfur compounds.

It is at this point or any point further on in the cellophane making process that the transition metal compound may be incorporated. One qualification in regard to the addition of the transition metal compounds is that they may not be added at a point in the cellophane making process at which compounds or chemicals are present, or are to be added, which will interfere, or negate, the color-changing property of the transition metal compound or wash it out. Although it is not explicitly mentioned herein above in regard to the base materials, the same limitations as to interference by chemicals or compounds apply to cellulosic paper-making procedures.

The last two tanks of the washing cycle in the cellophane process contain softening solutions such as aqueous ethylene glycol or aqueous glycerol. At this point in the washing cycle, water-soluble resin treatments may also be employed for coating the base film. The added resin is partially cured in the dryer and finally cured in the coating step. Sizes may also be added at this point in the system. The cellophane film is then passed through a dryer (where excess moisture is removed) and either wound into rolls or sent directly to coating machines.

Synthetic paper base materials

It is also possible to contact fibrous or non-fibrous synthetic paper base materials with the transition metal compounds disclosed herein to form synthetic photochromic paper.

By the term "synthetic paper," as used herein and throughout the instant specification, is meant paper sheets produced from synthetic polymeric materials such as those set forth hereinabove, more specific examples of which are shown, e.g., in U.S. Patent No. 2,810,646, along with methods for the production thereof, which patent is hereby incorporated into the instant disclosure by reference. Complete descriptions of fiber making procedures can be found in U.S. Patents Nos. 2,558,735, 2,595,847, 2,613,195, 2,611,929 and 2,644,803, which patents are also incorporated herein by reference.

Non-limiting examples of the foregoing are such materials as nylon and related polyamide polymers, polyethylene glycol terephthalate, and related polyester resins, polymers of acrylonitrile, such as copolymers containing at least 75%, by weight, of acrylonitrile with other comonomers such as vinyl acetate, vinyl chloride, vinyl pyridine, and esters of acrylic or methacrylic acid may be employed.

In a manner similar to that described above with respect to cellulosic paper, the transition metal compound may be applied as a solution in a suitable solvent to the surface of finished synthetic paper materials or the compound may be added to the synthetic paper at any convenient stage during the manufacture thereof.

The products of the present invention are either base materials coated with the transition metal compounds or base materials wherein the transition metal compound is uniformly dispersed or distributed throughout the mass of these substrates. The amount of transition metal compound added to the cellulosic paper, regenerated cellulose or synthetic paper according to the above defined procedures, is not critical. It is however, generally necessary to add enough transition metal compound so as to produce a visual change in color. That is to say, the cellulosic paper, regenerated cellulose or synthetic paper itself may have the ability to block out some of the ultraviolet or visible light with which the transition metal component is to come into contact and therefore enough transition metal material must be present so as to allow for this reduced quantity of ultraviolet or visible light with which it comes into contact and still produce a color change. We have generally found that amounts of transition metal compound ranging from 0.1% to about 15%, by weight, based on the dry weight of the cellulosic paper, synthetic paper or regenerated cellulose, are sufficient to obtain a satisfactory visible color change.

It is possible to lengthen the life of the cellulosic paper, regenerated cellulose or synthetic paper compositions by incorporating various amounts of ultraviolet light absorbers into them or by coating them with a material containing an ultraviolet light absorber. When additives such as these are added, any conventional compound known to function as an ultraviolet light absorber may be employed. Examples of such compounds are the 2-hydroxy benzophenones, e.g., 2,4-di-hydroxy benzophenones; the 2(2-hydroxyphenyl)-benzotriazoles, e.g., 2(2-hydroxy-4-methoxyphenyl)benzotriazole and the like. In this manner, the photochromic life of the photochromic material is lengthened by preventing an extraneous amount of ultraviolet light from coming into contact therewith. When absorbers of this type are added, amounts up to about 20% by weight based on the weight of the substrate may be used.

The exact phenomena which occur upon contacting the components of the compositions claimed herein are not completely understood. It is known however, that the compositions are not photochromic unless at least the base material or the solvent used to dissolve the transition metal compound, either when applied as a coating or when added during the manufacture of the base material, contains oxygen in free or combined form, and until the compositions are dried. Of course, since cellulose contains chemically combined oxygen, the solvent in the instant invention need not be oxygen-containing. While we do not wish to be bound by any explanation or theory of the photochromic mechanism, it is possible that the materials become photochromic by the formation of a metal adduct with the base material. For example, utilizing cellulosic paper and tungsten hexachloride, the photochromism could possibly result by formation of a tungsten addition product with a reactive oxygen in the paper.

The mechanism of the photochromic change is possibly an electron transfer reaction, mentioned above, wherein electrons are transferred from the cellulose by ultraviolet excitation to give reduced tungsten. The reverse process is possibly a relaxation of this configuration as follows in the case of a tungsten addition product:

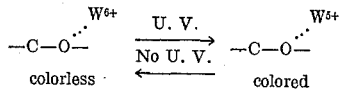

The novel cellulosic paper and regenerated cellulose products of the instant invention may be used for such items as memory devices, e.g., temporary photographic proofs, temporary data storage, temporary high speed direct recording paper for oscillographs; decorative materials, e.g., package wrappings, advertising articles; photocopy methods, e.g., production of permanent positive temporary negatives, temporary positives and the like.

In order that the present invention may be more completely understood, the following examples are given in which all parts are parts by weight unless otherwise specified. These examples are set forth primarily for the purpose of illustration and any specific enumeration of detail contained therein should not be interpreted as a limitation on the case except where indicated in the appended claims.

Example 1

50 parts of tungsten hexachloride is dissolved in 1000 parts of dioxane. Sheets of cellulose paper are dipped into the solution, excess solution is drained off and the sheet is dried in air. The dry sheets turn blue on exposure to ultraviolet light and revert (bleach) to the colorless state when removed from the ultraviolet light source. Bleaching may be hastened by exposure to infrared radiation.

Example 2

50 parts of tungsten hexachloride is dissolved in 1000 parts of absolute alcohol. Kaolin-treated cellulosic paper is dipped in the solution and the excess allowed to drain off. The sheets are dried in the oven at 45° C. and turn blue when exposed to ultraviolet light. When removed from the ultraviolet light, the sheets revert to their colorless state.

Example 3

12.5 parts of tungsten oxytetrachloride is dissolved in a solution of 20 parts of polymethylmethacrylate in 80 parts methylethyl ketone. The mixture is filtered and then coated on cellulosic paper using a Gardner knife. After drying, the sheets of paper turn blue when exposed to ultraviolet light and revert to the colorless state when removed from the light source. The added polymer reduces the bleaching rate of the photochromic sheet.

Example 4

To a slurry of wood pulp in an 80:20 mixture of dioxane and water containing 1% of a sulfite rosin size and 2% alum, is added 1%, by weight of WOCl₄ based on the weight of the dry pulp. The slurry is agitated for 10 minutes. The resultant suspension is formed into white hand sheets at 50 lb. basis weight (25″ x 40″/500 ream) on a Nash hand sheet machine and dried at 240° F. The sheets produced are conditioned at 60° F. and 50% relative humidity for 24 hours. They are then contacted with ultraviolet light for 10 minutes. The white sheets turn a deep blue and revert to white when removed from the ultraviolet light.

Example 5

A dioxane suspension, of about 0.7% consistency, of bleached Northern Craft Pulp beaten to a Canadian Standard freeness of 450–500 ml. is formed. WCl₆, 2%, based on the dry weight of the fibers, is added and the suspension is gently stirred for 5 minutes. The suspension is formed into white hand sheets in a manner set forth above in Example 4. The sheets turn a deep blue upon contact with ultraviolet light and revert to their original color when said light is removed.

Example 6

An 18% aqueous caustic solution of wood pulp is produced by mixing the wood pulp with NaOH solution. The wood pulp is steeped for about 35 minutes and the resultant alkali cellulose is pressed, shredded and aged for 3 days. Carbon disulfide is added to the alkali cellulose in a large vat to produce sodium cellulose xanthate which is then dissolved in a caustic solution. The xanthate material is filtered, deaerated and ripened for 2 days. The resultant viscose is agitated and then extruded in the form of sheets into coagulating and regenerating bath of sulfuric acid and sodium sulfate. The film is then washed with dilute sulfuric acid and sodium sulfate, then with dilute caustic and finally with water. To this film is then added 1.5% by weight, based on the weight of the dry pulp, of NbCl₅. A 90:10 mixture of dioxane and water is then contacted with the film which is then washed with a softening solution comprising aqueous ethylene glycol. The film is then passed through a dryer and dried at 165° F. The resultant cellophane turns blue upon contact with ultraviolet light and reverts to its original appearance when removed from said light.

Example 7

Wet spun, 3-denier polyacrylonitrile textile filaments are hand chopped to about ¼″ to 1″ lengths and slurried with an 80:20 mixture of dioxane and water to a 1% consistency. The resultant slurry is beaten in a one pound Valley laboratory beater with ten pounds on the bedplate arm.

To the resultant beaten slurry is then added 3% by weight, based on the dry weight of the polyacrylonitrile, of WCl₆. Samples of the suspension are then withdrawn and are formed into synthetic paper sheets on a Nash handsheet machine. The sheets are dried on a drum at 240° F. for about 60 seconds. Upon contact of the dry sheets with ultraviolet light, they turn from white to a deep blue and revert to original color when removed from said light.

We claim:

1. A photochromic composition comprising cellulose which has been contacted with a solution of a color producing amount of a metal compound having the formula $$MX_mO_n(OR)_p$$

wherein M is a metal selected from the group consisting of titanium, zirconium, tungsten, hafnium, tantalum, chromium, vanadium and niobium; X is halogen; R is selected from the group consisting of an alkyl radical having from 1–12 atoms, inclusive, an aryl radical having from 6–10 carbon atoms, inclusive, and $$-\underset{\underset{O}{\|}}{C}-R'$$

wherein R¹ is selected from the group consisting of an alkyl radical having from 1–12 carbon atoms, inclusive, and an aryl radical having from 6–10 carbon atoms, inclusive; m and p are whole positive integers of from 0–6 inclusive; and n is a whole positive integer of from 0–2, inclusive; the total of $2n+m+p$ being equal to the valence of the metal M, at least one of m and p being an integer of at least 1.

2. The composition of claim 1 wherein said cellulose is in the form of paper.

3. The composition of claim 2 wherein said metal compound is intimately and uniformly distributed throughout said cellulose paper.

4. The composition of claim 1 wherein said metal compound is WCl₆.

5. The composition of claim 2 wherein the metal compound is WCl₆.

6. The composition of claim 3 wherein the metal compound is WCl₆.

7. A method of producing the photochromic composition of claim 1 which comprises contacting cellulose with a solution of a color producing amount of a metal compound having the formula $$MX_mO_n(OR)_p$$

wherein M is a metal selected from the group consisting of titanium, zirconium, tungsten, hafnium, tantalum, chromium, vanadium and niobium; X is halogen; R is selected from the group consisting of an alkyl radical having from 1 to 12 carbon atoms, inclusive, an aryl radical having from 6 to 10 carbon atoms, inclusive, and $$-\underset{\underset{O}{\|}}{C}-R^1$$

wherein R¹ is selected from the group consisting of an alkyl radical having from 1 to 12 carbon atoms, inclusive, and an aryl radical having from 6 to 10 carbon atoms, inclusive; m and p are whole positive integers of from 0 to 6, inclusive; and n is a whole positive integer of from 0 to 2, inclusive, the total of $2n+m+p$ being equal to the valence of the metal M, at least one of m and p being an integer of at least 1 and drying the resultant cellulose.

8. A method according to claim 7 wherein said metal compound is WCl₆.

References Cited

UNITED STATES PATENTS 3,304,180   2/1967   Dorion et al. _____ 96—90

OTHER REFERENCES

G. H. Brown: Photograph, a Literature Review. December 1959, AD 234,009, pp. 18–20. 96–90PC.

El-Sayed: "New Glass of Photochromic Substances: Carbonyls," J. Phip. Chem. 68, 433–4 (1964), 96–90PC.

G. Singh: "Photography of Inorganic Salts," J. Chem. Soc., 121. 782–5 (1922) 96–90PC.

NORMAN G. TORCHIN, *Primary Examiner.*

C. E. DAVIS, *Assistant Examiner.*